(12) United States Patent
Halbur et al.

(10) Patent No.: US 7,905,416 B2
(45) Date of Patent: Mar. 15, 2011

(54) MECHANICALLY CONVERTIBLE TRANSACTION PRODUCT

(75) Inventors: Ted C. Halbur, Lino Lakes, MN (US); Timothy P. Clegg, Manhatten Beach, CA (US); Primoz Samardzija, Marina del Ray, CA (US)

(73) Assignee: Target Brands, Inc., Minneapolis, MN (US)

( * ) Notice: Subject to any disclaimer, the term of this patent is extended or adjusted under 35 U.S.C. 154(b) by 763 days.

(21) Appl. No.: 11/753,854

(22) Filed: May 25, 2007

(65) Prior Publication Data

US 2008/0290177 A1 Nov. 27, 2008

(51) Int. Cl.
*G06K 5/00* (2006.01)

(52) U.S. Cl. ........................................ 235/487; 235/380

(58) Field of Classification Search .................. 235/379, 235/380, 487, 493; 713/161, 167, 182, 193; 446/128, 268, 315, 381, 383
See application file for complete search history.

(56) References Cited

U.S. PATENT DOCUMENTS

| | | | |
|---|---|---|---|
| 172,709 | A | 1/1876 | Crandall |
| 246,867 | A | 9/1881 | Cooke |
| 969,309 | A | 9/1910 | Kennedy |
| 976,495 | A | 11/1910 | Reeves |
| 1,028,479 | A | 6/1912 | Morgan |
| 1,038,057 | A | 9/1912 | Younger |
| 1,041,573 | A | 10/1912 | Baring-Gould |
| 1,357,421 | A | 11/1920 | Raizen |
| 1,387,097 | A | 8/1921 | Benton |
| 2,170,953 | A | 8/1939 | Spots |
| 2,347,561 | A | 4/1944 | Howard et al. |
| 2,573,625 | A | 10/1951 | Swart |
| 3,090,157 | A | 5/1963 | Lohr |
| 4,087,576 | A | 5/1978 | Patterson |
| 4,294,036 | A | 10/1981 | Wion |
| 4,411,097 | A * | 10/1983 | Murakami ................... 446/376 |
| D283,335 | S * | 4/1986 | Matsuda ...................... D21/584 |
| D283,336 | S * | 4/1986 | Matsuda ...................... D21/584 |
| D288,221 | S * | 2/1987 | Matsuda ...................... D21/513 |
| D295,059 | S * | 4/1988 | Matsuda ...................... D21/584 |
| 4,925,429 | A | 5/1990 | Kaulfuss et al. |
| 5,310,378 | A * | 5/1994 | Shannon ....................... 446/268 |
| 6,227,931 | B1 * | 5/2001 | Shackelford .................. 446/268 |
| 6,439,953 | B1 | 8/2002 | Liu |
| 6,592,426 | B2 * | 7/2003 | Mesch .......................... 446/310 |
| D513,869 | S | 1/2006 | Hunter, Jr. et al. |
| 7,445,157 | B2 | 11/2008 | Clegg et al. |

(Continued)

OTHER PUBLICATIONS

American Express Butterfly Card, http://www.coolhunting.com/archives/2006/06/american_expres.php, Jun. 22, 2006 (3 pages).

(Continued)

*Primary Examiner* — Thien M Le
(74) *Attorney, Agent, or Firm* — Griffiths & Seaton PLLC

(57) ABSTRACT

A mechanically convertible transaction product includes a body, two or more appendages, and an account identifier. Each of the two or more appendages is rotatably coupled with the body and configured to selectively rotate relative to the body between a compact position and an expanded position. Each appendage extends further away from the body when in the expanded position such that an overall form of the transaction product is altered when any of the appendages are in the expanded position as compared to when all of the appendages are in the compact position. The account identifier links the transaction product to an account or record. Stored-value products, combinations, methods of providing a transaction card, and other embodiments are also disclosed.

27 Claims, 13 Drawing Sheets

U.S. PATENT DOCUMENTS

| | | |
|---|---|---|
| 2002/0143697 A1 | 10/2002 | Gotfried |
| 2005/0194454 A1 | 9/2005 | Ferber et al. |
| 2006/0080539 A1* | 4/2006 | Asami et al. ............... 713/182 |
| 2007/0016941 A1 | 1/2007 | Gonzalez et al. |
| 2007/0215694 A1 | 9/2007 | Clegg |
| 2007/0252010 A1 | 11/2007 | Gonzalez et al. |

OTHER PUBLICATIONS

Halbur et al., "Stored-Value Card with Housed Object," U.S. Appl. No. 11/404,584, filed Apr. 14, 2006.

Boyd et al., "Financial Transaction Card with Pop-up Member," U.S. Appl. No. 11/615,861, filed Dec. 22, 2006.

* cited by examiner

MECHANICALLY CONVERTIBLE TRANSACTION PRODUCT

BACKGROUND OF THE INVENTION

Stored-value cards and other transaction cards come in many forms. A gift card, for example, is a type of transaction card that includes a pre-loaded or selectively loaded monetary value. In one example, a consumer buys a gift card having a specified value for presentation as a gift to another person. In another example, a consumer is offered a gift card as an incentive to make a purchase. A gift card, like other transaction cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction cards provide a number of advantages to both the consumer and the retailer.

SUMMARY OF THE INVENTION

One aspect of the present invention relates to a transaction product including a body, two or more appendages, and an account identifier. Each of the appendages is rotatably coupled with the body and configured to selectively rotate relative to the body between a compact position and an expanded position. Each appendage extends further away from the body when in the expanded position such that an overall form of the transaction product is altered when any of the appendages are in the expanded position as compared to when all of the appendages are in the compact position. The account identifier links the transaction product to an account or record. Stored-value products, methods of providing a transaction card, and other embodiments of transaction or transaction cards and associated combinations are also disclosed.

BRIEF DESCRIPTION OF THE DRAWINGS

Embodiments of the invention will be described with respect to the figures, in which like reference numerals denote like elements, and in which.

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the invention.

A stored-value card or other transaction product is adapted for making purchases of goods and/or services at, for example, a retail store or web site. According to one embodiment, an original consumer buys a transaction product to give a recipient who in turn is able to use the transaction product to pay for goods and/or services. A transaction product, according to embodiments of the present invention, additionally provides the consumer and/or recipient with a toy that can be mechanically converted between two shapes or forms, for example, between a first, substantially rectangular form or shape to a second, non-rectangular form or shape. In one example, while in the second non-rectangular form, the transaction product is in the shape of an action figure, character, animal, person, or other toy configured to amuse the bearer of the transaction product.

Figure 7:
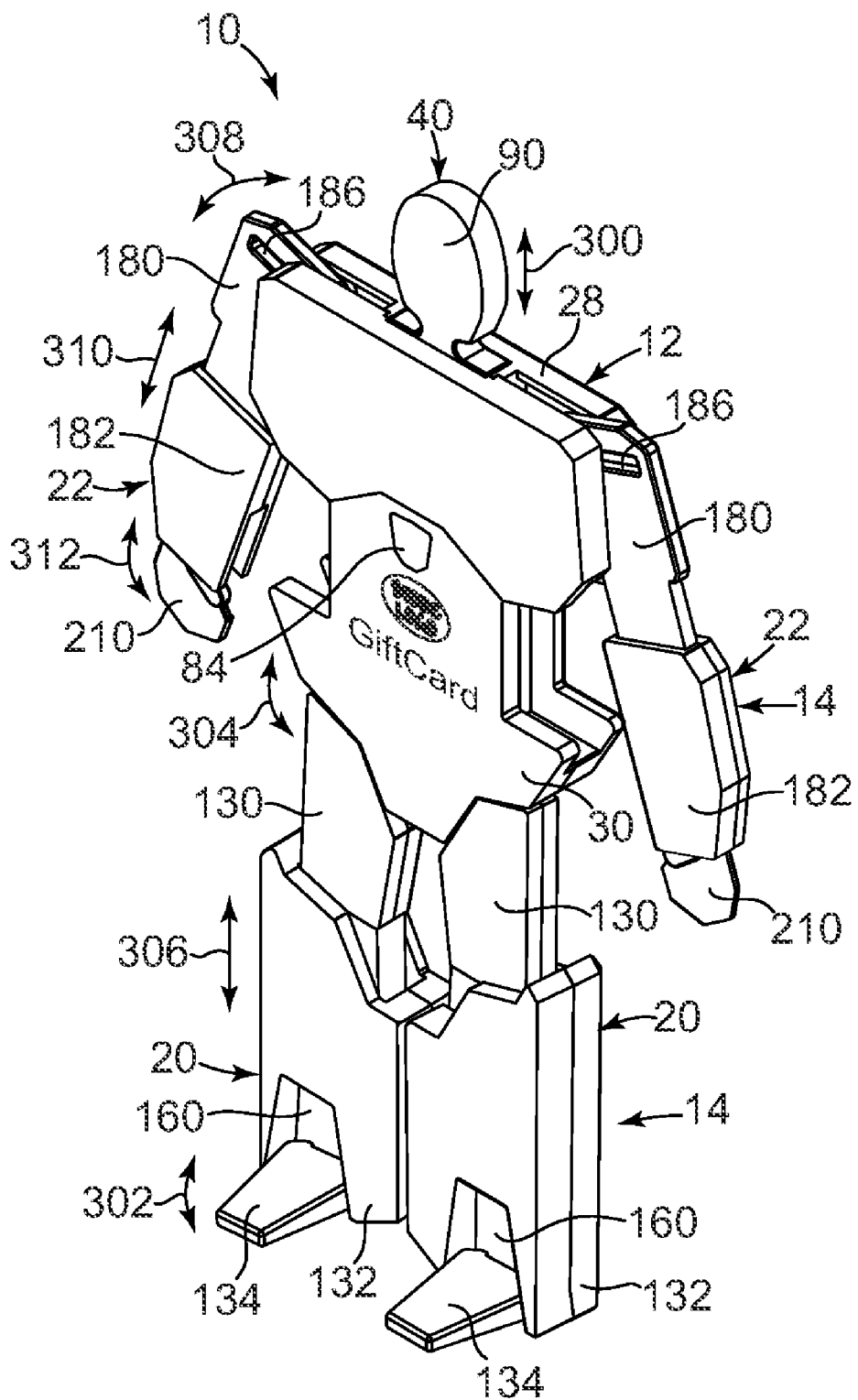
FIG. 7 is a perspective view illustration of the transaction product of FIG. 1 in an expanded form.

Turning to the figures, FIGS. 1-7 illustrate various views of one embodiment of a transaction product 10 (e.g., a stored-value card) in a first or compact form (FIGS. 1-6) and a second or expanded form (FIG. 7). Transaction product 10 includes a primary component, body, or torso 12 and one or more auxiliary components 14 configured to selectively move relative to one another to transition transaction product 10 between the initial form and the converted form. For example, in one embodiment, torso 12 and auxiliary component(s) 14 collectively define transaction product 10 with a substantially rectangular shape in the converted or expanded form and collectively have a non-rectangular form factor in the expanded form. In one embodiment, when in the transaction product 10 is in the compact form, transaction product 10 has a length and width similar to that of an identification card, a credit card, or other card sized to generally fit in a wallet of a card bearer (i.e. is wallet sized). In other embodiments, transaction product 10 is otherwise shaped as a square, circle, oval, star, or any other suitable shape when in the compact form. In one embodiment, in the converted form, transaction product 10 is in the shape of a fanciful character such as an action figure, person, animal, etc.

Figure 1:
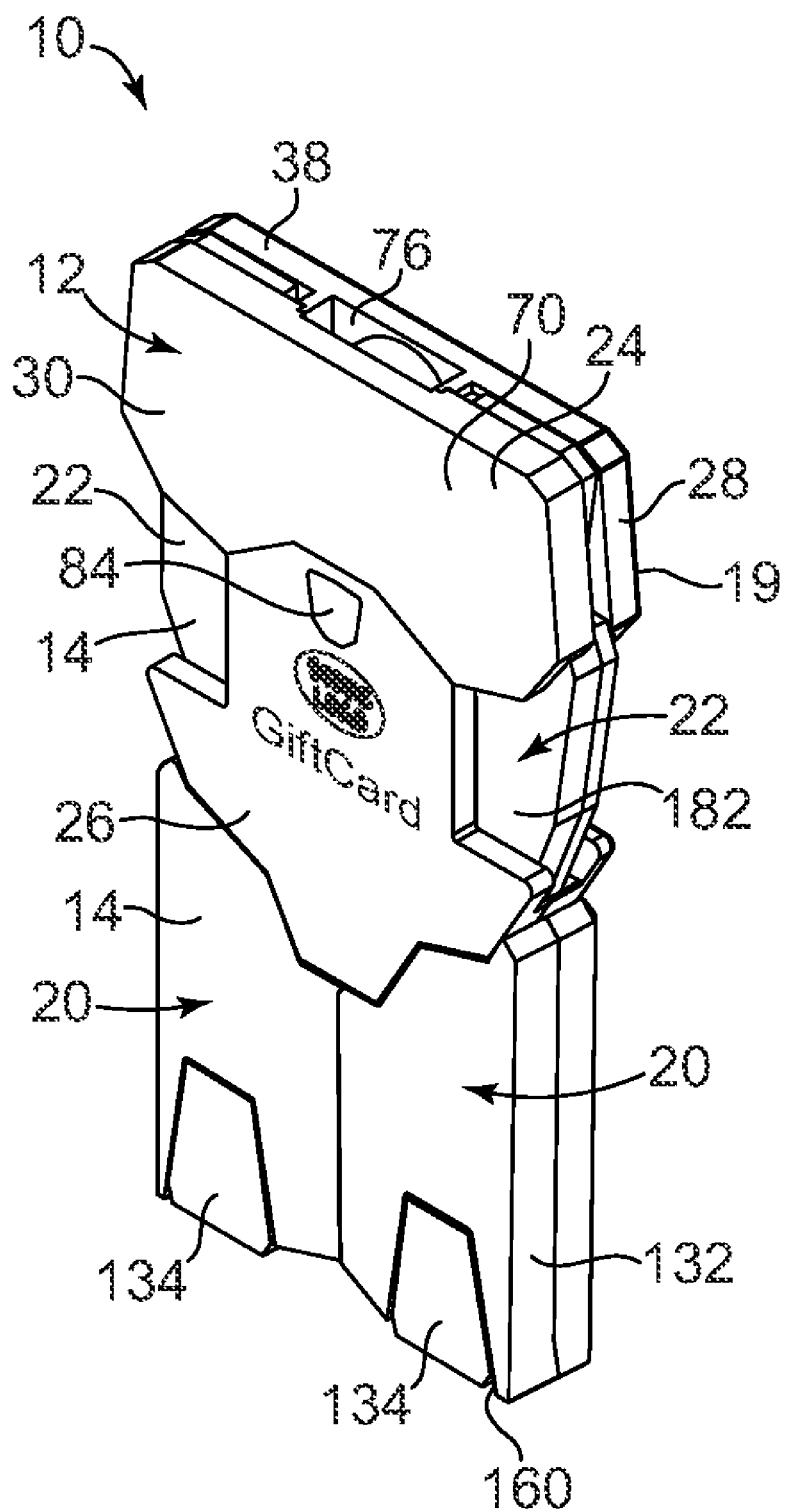
FIG. 1 is a perspective view illustration of a transaction product in a compact form, according to one embodiment of the present invention.
Figure 2:
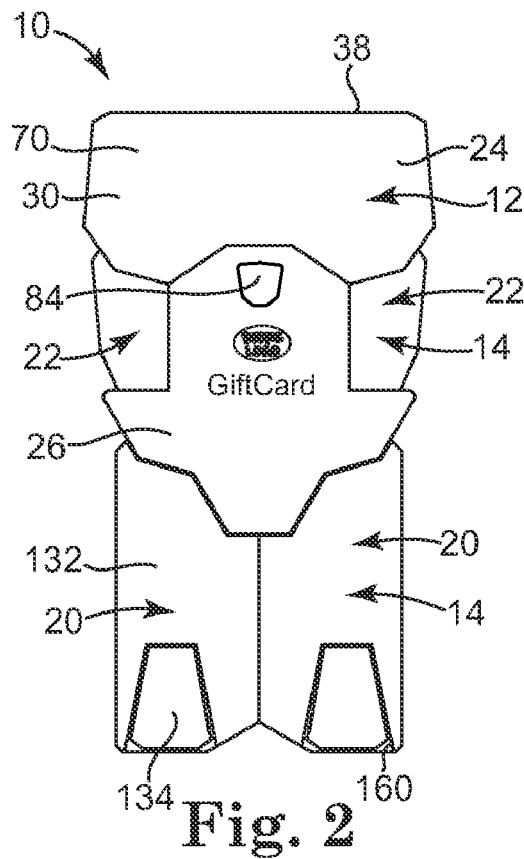
FIG. 2 is a front view illustration of the transaction product of FIG. 1 in the compact form.
Figure 3:
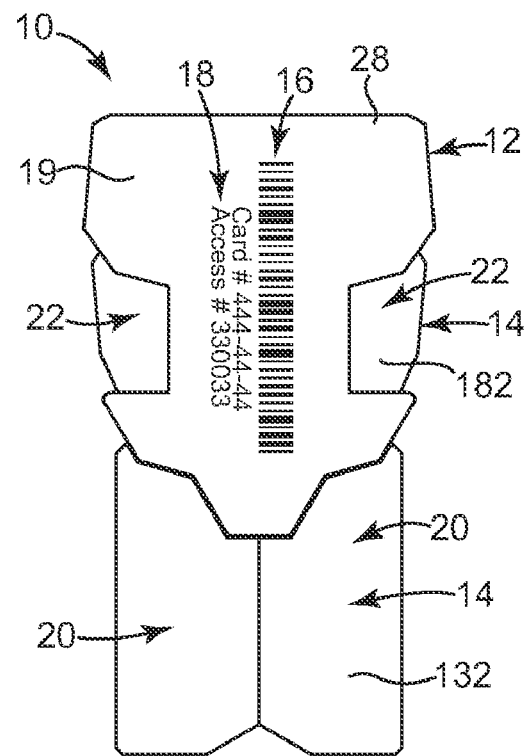
FIG. 3 is a rear view illustration of the transaction product of FIG. 1 in the compact form.
Figure 4:
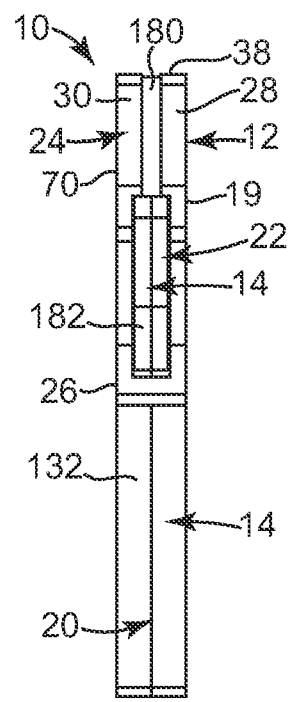
FIG. 4 is a right side view illustration of the transaction product of FIG. 1 in the compact form; the left side view being a mirror image of the right side view when the transaction product is in the compact form.
Figure 5:
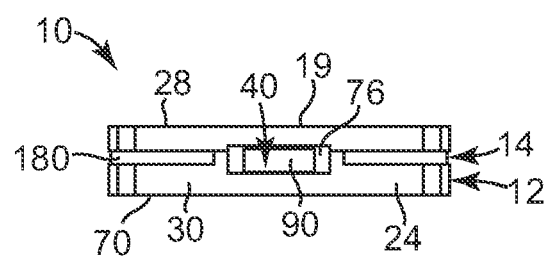
FIG. 5 is a top view illustration of the transaction product of FIG. 1 in the compact form.
Figure 6:
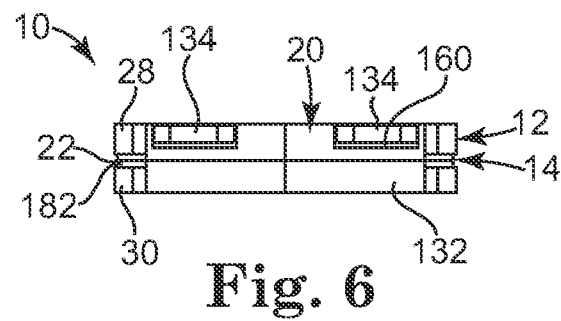
FIG. 6 is a bottom view illustration of the transaction product of FIG. 1 in the compact form.

Referring to the rear view illustration of FIG. 3, transaction product 10, for example, torso 12, includes at least one account activation area or account identifier 16, such as a bar code, a magnetic strip, a smart chip or other electronic device, a radio frequency identification (RFID) device, or other suitable identifier readily machine readable by a point-of-sale terminal, account access station, kiosk, or other suitable device. In one embodiment where account identifier 16 is machine readable, account identifier 16 is also readable by a bearer of transaction product 10 such that transaction product 10 can be used when a machine configured to read transaction product 10 is not present (e.g., when using transaction product 10 to make a purchase on a web site).

In one embodiment, account identifier 16 includes a machine readable portion and a card number such that at least a portion of account identifier 16 can be read by each of a machine and the bearer of transaction product 10. In one example, an access code 18 may accompany account identifier 16. Access code 18 is configured to provide additional security for use of transaction product 10 as will be apparent to those of skill in the art upon reading the present application. In one embodiment, account identifier 16 is printed on or otherwise applied to rear external surface 19 of torso 12; however, account identifier 16 may be printed on or otherwise applied to any of the plurality of auxiliary components 14.

Account identifier 16 links transaction product 10 to a financial or other transaction account or record. The account or record indicates a value or balance (e.g., monetary value, points, minutes, or other balance) associated with transaction product 10 and optionally is maintained on a database, other electronic or manual record-keeping system, or, in the case of "smart" cards for example, on a chip or other electronic device on or in transaction product 10. Accordingly, by scanning account identifier 16, the account or record linked to transaction product 10 is identified and can subsequently be activated, have amounts deducted therefrom, and/or have amounts credited thereto. In one embodiment, account identifier 16 is included on rear external surface 19 of rear torso member 28; however, account identifier 16 may otherwise be coupled with any other portion of transaction product 10. Account identifier 16 is one example of means for linking transaction product 10 with an account or record.

In one embodiment, transaction product 10 includes torso 12 and two or more auxiliary components 14 (e.g., transaction product appendages). In one example, the two or more auxiliary components 14 includes two legs 20 and two arms 22. Each of legs 20 and arms 22 movably coupled (e.g., slidably, rotatably, or otherwise suitably coupled) with torso 12. As such, legs 20 and arms 22 are each movable between a first or compact position and a second or expanded position to mechanically convert the overall form/shape of transaction product 10 between the compact form and the expanded form. In one embodiment, legs 20 and arms 22 each move from the compact position further away from torso 12 to form limbs or appendages of the resultant toy torso of an action figure, animal, or other character.

Torso 12, legs 20, and arms 22 may be formed out of any suitable material. In one embodiment, members of torso 12, legs 20, and arms 22 are formed of injection molded plastic (e.g., polycarbonate, acrylic, poly vinyl chloride (PVC), etc.). Other additional or alternative auxiliary components and methods of forming such components will be apparent to those of skill in the art upon reading the present application.

Figure 8:
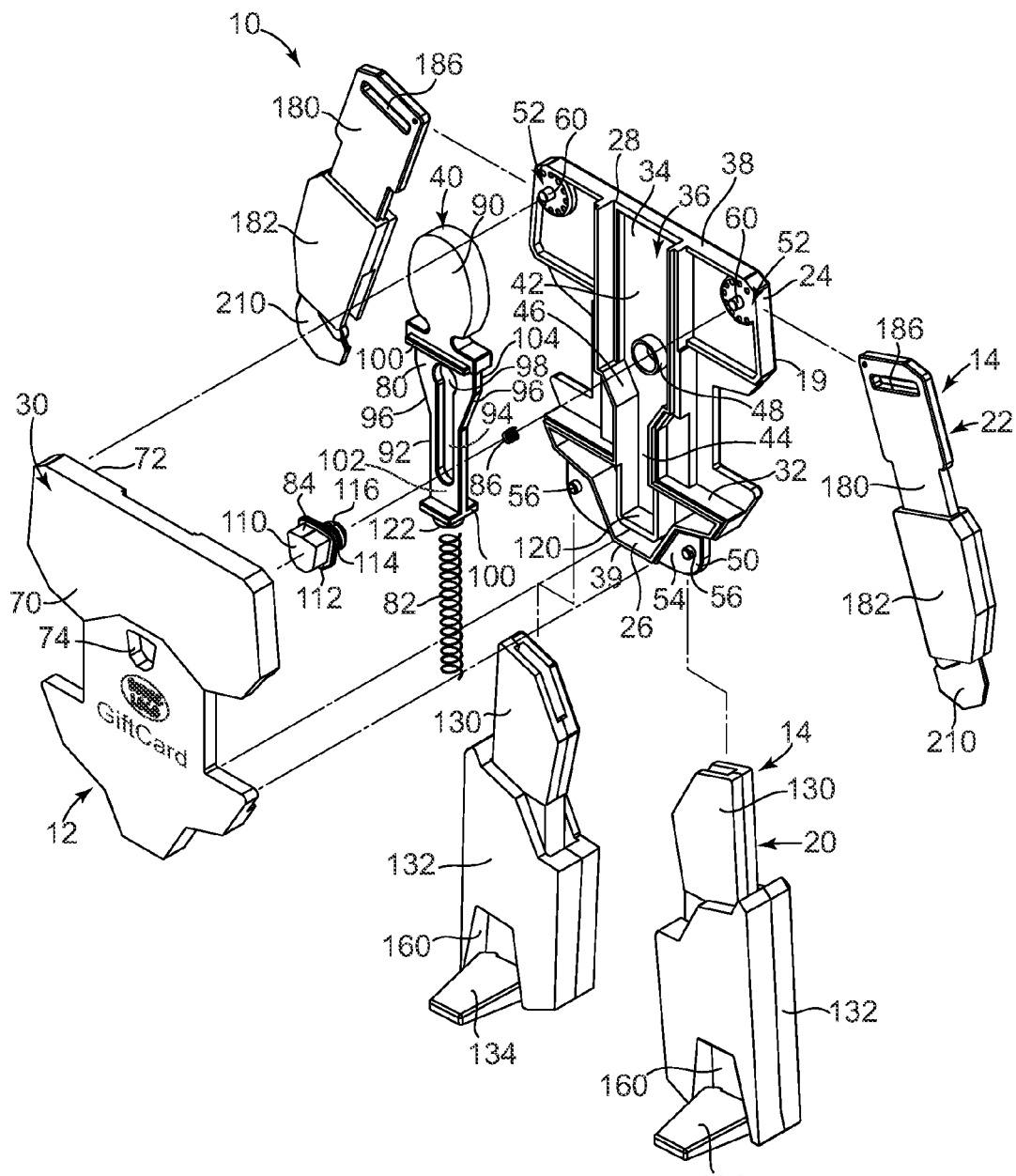
FIG. 8 is an exploded perspective view illustration of the transaction product of FIG. 1, according to one embodiment of the invention.

Referring to FIG. 8, in one embodiment, torso 12 is shaped to define an upper or shoulder portion 24 and a lower or pelvic portion 26. In one example, torso 12 includes a rear torso member 28 and a front torso member 30 configured to snap or otherwise be coupled to one another where each of rear torso member 28 and front torso member 30 define a portion of shoulder portion 24 and pelvic portion 26. Additionally, referring to the exploded view of FIG. 8, rear torso member 28 defines a rear external surface 19 (see also FIG. 3) that, in one embodiment, is substantially planar, and a side wall 32 extending forward from a rear internal surface 34 defined opposite rear external surface 19.

In one example, side wall 32 defines an elongated cavity 36 extending from a top edge 38 of rear torso member 28 toward a bottom edge 39 of rear torso member 28 for selectively receiving a head assembly 40 as will be further described below. Cavity 36 includes an upper portion 42 and a lower portion 44 where upper portion 42 is wider than lower portion 44. In one example, angled surfaces 46 are defined by side wall 32 and taper cavity 36 to gradually transition a width of cavity 36 from upper portion 42 to lower portion 44. In one embodiment, a rim 48 extends forwardly from internal surface 34 of rear torso member 28 and is positioned within cavity 36. In one example, rim 48 is substantially circular in shape.

In one embodiment, rear torso member 28 includes leg coupling members 50 and arm coupling members 52 each configured to receive one of legs 20 and arms 22, respectively. In one embodiment, each leg coupling member 50 includes a downwardly extending flange 54 at each lower corner thereof and an axle or peg 56 forwardly or rearwardly (not shown) extending from flange 54 of rear torso member 28. Each peg 56 is configured to rotatably receive a complimentary portion of one of legs 20 as will be further described below.

In one embodiment, each arm coupling member 52 includes a pin 60 extending forward from rear internal surface 34 of rear torso member 28 within shoulder portion 24. More particularly, in one example, one pin 60 extends from each upper corner of rear torso member 28. Each pin 60 is configured to rotatably receive a complimentary portion of one of arms 22 as will be further described below.

Front torso member 30 is formed with an overall shape similar to an overall shape of rear torso member 28. Front torso member 30 defines a front external surface 70, a front inside surface 72 (generally indicated in FIG. 8) opposite front external surface 70, and, in one embodiment, an aperture 74 (FIG. 8) extending therethrough. Front torso member 30 is positioned such that front inside surface 72 faces rear internal surface 34 of rear torso member 28, and is coupled to rear torso member 28 with a snap or friction fit coupling, adhesive, or other suitable coupling method or agent(s). In one embodiment, coupling of rear torso member 28 and front torso member 30 substantially encloses cavity 36 leaving only an opening 76 (FIGS. 1 and 5) defined between rear torso member 28 and front torso member 30 visible along a top edge 38 of torso 12.

In one embodiment, auxiliary components 14 include a head assembly 40. Head assembly 40 includes a head member 80, a head spring 82, a button 84, and a button spring 86. In one example, head member 80 is formed as a single piece of material and includes a head portion 90 and a track portion 92. Head portion 90 is shaped to form a head of the action figure, animal, person, character, etc. formed by transaction product 10 in the expanded form and is configured to selectively extend out of and be stored substantially within torso 12.

Track portion 92 extends downwardly from head portion 90 and defines a track 94 therein. In one example, a section of track portion 92 tapers inwardly from head portion 90 to define angled edges 96. In one embodiment, track 94 is formed as an elongated, linear slot or groove defining an enlarged end 98 near a top of track 94. In one example, one or more lateral ribs 100 extend outwardly from front and rear surfaces 102 and 104 of head member 80.

Button 84 includes an interface portion 110, a rim 112, a neck 114, and a bulbous end 116. Interface portion 110 is any suitable portion configured to be directly or indirectly contacted by a bearer of the transaction product 10 to actuate head assembly 40. Rim 112 extends radially outwardly from a rear edge of interface portion 110 and is configured to facilitate interaction with torso 12 as will be further described below. Neck 114 extends rearwardly from interface portion 110 and generally has a diameter at least slightly smaller than a width of track 94 through the narrowest portions thereof.

Bulbous end 116 is formed on an end of neck 114 opposite interface portion 110. In one embodiment, bulbous end 116 is sized with an outer dimension larger than the width of track 94, but slightly smaller than enlarged end 98. In this manner, button 84, more specifically, bulbous end 116 and a portion of neck 114 can be pushed through enlarged opening 98 of track 94 and slid up and down the remainder of track 94 with bulbous end 116 being adjacent rear surface 104 of head member 80, interface potion 110 being adjacent from surface 102 of head member 80, and neck 114 extending through head member 80.

Springs 82 and 86 are any suitable springs such as coil springs. Head spring 82 is positioned within cavity 36 of rear torso member 28 to interact with a bottom surface 120 thereof at one end and a bottom end 122 of track portion 92 at the other end. Head spring 82 is configured to bias head member 80 to extend out of torso 12 and is compressed when head member 80 is substantially stored within torso 12 as will be further described below. Button spring 86 is positioned to sit within rim 48 of rear torso member and to interact with button 84. Button spring 86 biases button 84 toward front external surface 70 of torso 12. In one embodiment, button 84 is positioned such that interface portion 110 is accessible through aperture 74 in front torso member 30 and such that rim 112 of button 84 interacts with front torso member 30 to generally prevent button 84 from being pushed out of torso 12 due to the biasing force of button spring 86.

Upon assembly of head assembly 40 with torso 12, head member 80 is configured to move between a compact position within torso 12 as illustrated in FIGS. 1-6 and an expanded position, in which head portion 90 of head member 80 extends out of torso 12 in a direction generally indicated by arrow 300 in FIG. 7. More specifically, when head member 80 is in the compact position, head spring 82 is compressed, and bulbous end 116 of button 84 is positioned in enlarged end 98 of track 94. In one embodiment, when in the compact position, angled edges 96 of head member 80 interact with angled surfaces 46 of rear torso member 28 to decrease over compression of head spring 82, which in turn increases the functional life of head spring 82.

Button spring 86 biases button 84 toward front surface 70 such that bulbous end 116 frictionally interacts with enlarged end 98 of track 94 to maintain head member 80 within torso 12. However, when button 84 is depressed, the bias of button spring 86 is overcome and button 84 is pushed back toward rear torso member 28. As such, neck 114, rather than bulbous end 116, aligns with track 94. Given the smaller diameter of neck 114 as compared to bulbous end 116, head member 80 is released and slides upwardly relative to button 84 due to the bias of head spring 82. As such, push button 84 provides one example of means for actuating or initiating at least partial release of head member 80 from within cavity 36 of torso 12, and head spring 82 provides one example of means for biasing head member 80 to extend out of cavity 36 and thereby out of torso 12.

Upward movement of head member 80 stops when lateral ribs 100 of head member 80 contact top edge 38 and/or rim 48 of torso 12. When head member 80 is stopped, head portion 90 of head member 80 extends out of torso 12 beyond top edge 38 thereof. Head member 80 can be pushed back down into cavity 36 until button 84 aligns with enlarged end 98 of track 94 and bulbous end 116 is pushed outwardly into track 94 by button spring 86 to maintain head member 80 in cavity 36 until button 84 is pushed again. As such, bulbous end 116 of button 84 with button spring 86 and track 94 provide one example of means for selectively maintaining head member 80 within cavity 80.

Figure 9:
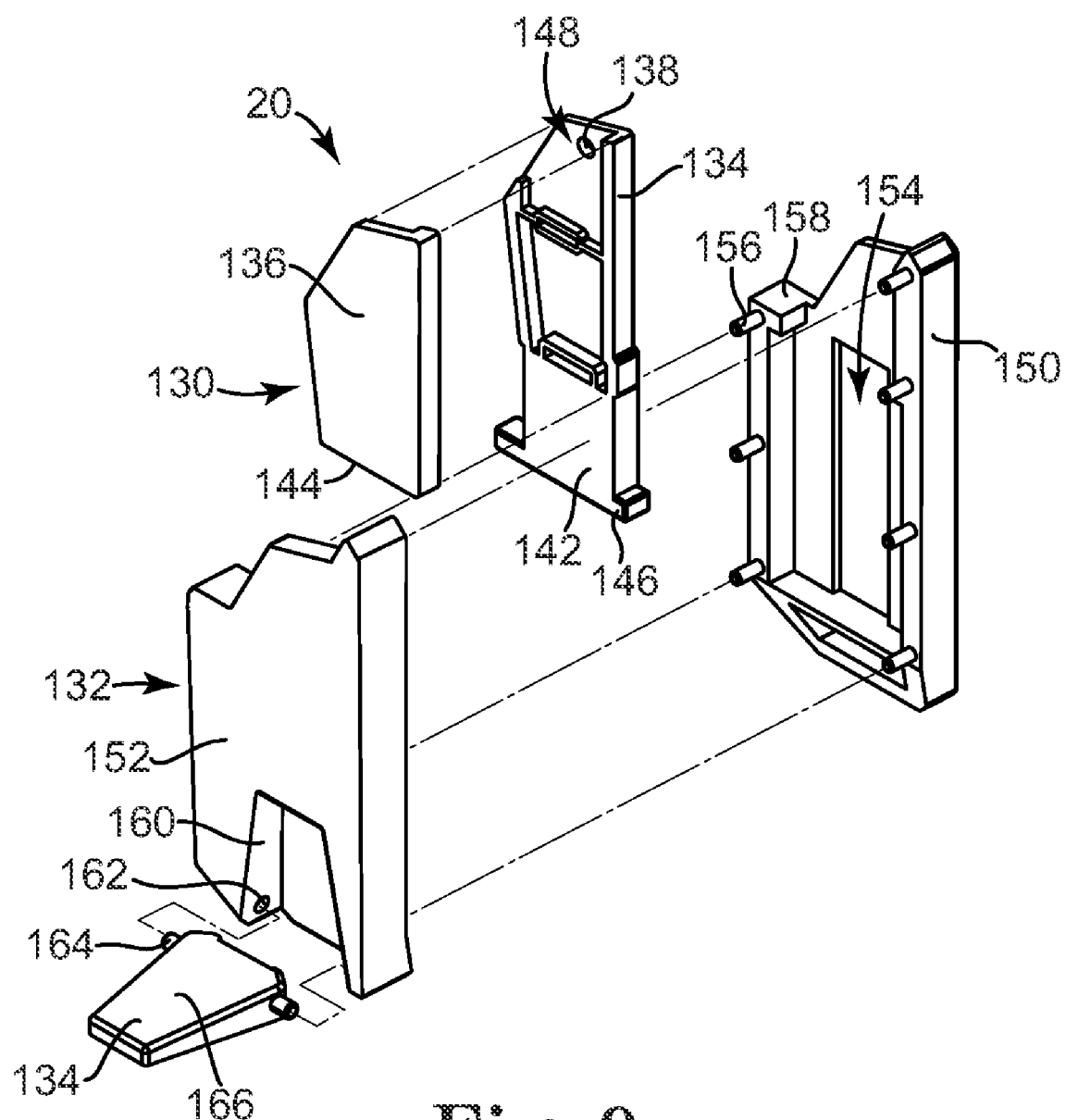
FIG. 9 is an exploded perspective view illustration of a leg of the transaction product of FIG. 8, according to one embodiment of the present invention.

An exploded, perspective view illustration of one embodiment of leg 20 is illustrated in FIG. 9. In one example, leg 20 includes a first or upper leg segment 130, a second or lower leg segment 132, and a foot 134. Upper leg segment 130 is configured to be movably coupled with torso 12 (FIG. 8), and lower leg segment 132 is slidably coupled with upper leg segment 130 such that the collective length of leg 20 can be selectively adjusted by sliding lower leg segment 132 relative to upper leg segment 130.

In one embodiment, upper leg segment 130 includes a rear upper leg member 134 and a front upper leg member 136 coupled to one another in any suitable manner. Each of rear upper leg member 134 and front upper leg member 136 define a cylindrical void 138 sized and shaped to each rotatably receive one of pegs 56 of torso 12, more particularly, of rear torso member 28. In addition, upon assembly of upper leg segment 130, rear upper leg member 134 and front upper leg member 136 are spaced from one another near a top portion 140 thereof to form a cavity 148 therebetween.

Additionally referring to FIG. 9, cavity 148 is sized to receive bottom flange 54 of torso 12 such that each peg 56 of torso 12 is received by one of cylindrical voids 138. More specifically, rear upper leg member 134 and front upper leg member 136 are positioned such that flange 54 is interposed between rear upper leg member 134 and front upper leg member 136 and each cavity 148 receives pegs 56 prior to being coupled together. As such, once upper leg segment 130 is assembled, upper leg segment 130 is also rotatably coupled with torso 12. More specifically, upon coupling, upper leg segment 130, and therefore all of leg 20, is configured to rotate about pegs 56 of torso 12 as generally indicated by arrow 304 in FIG. 7. In this manner, pegs 56 and cylindrical voids 138 provide one example of means for rotatably coupling arm 22 to torso 12. In one embodiment, upon assembly of upper leg segment 130, a bottom portion 142 of rear upper leg member 134 extends downwardly beyond a bottom 144 of front upper leg member 136. Bottom portion 142 defines extension tabs 146 extending laterally outwardly from bottom portion 142 opposite bottom 144 of front upper leg member 136.

In one embodiment, lower leg segment 132 is formed of a rear lower leg member 150 and a front lower leg member 152 configured to be coupled to one another in any suitable manner to define a chamber 154 therebetween. Chamber 154 is sized and shaped to slidably receive bottom portion 142 of rear upper leg member 134. In one example, rear lower leg member 150 includes a plurality of posts or pins 156 spaced from one another about a perimeter of rear lower leg member 150 and extending forwardly toward front lower leg member 152. In one example, front lower leg member 152 includes a plurality of cavities (not shown) each configured to receive one of pins 156 to register and align rear lower leg member 150 and front lower leg member 152 with one another and/or to facilitate a snap fit or other suitable coupling between the two members 150 and 152. In one embodiment, at least one of rear lower leg member 150 and front lower leg member 152 defines a lip 158 near a top portion thereof extending into chamber 154.

In one embodiment, front lower leg member 152 defines a cavity 160 near a bottom front section thereof including two cylindrical voids 162 spaced and extending opposite one another from cavity 160. In one example, where feet 134 are included in transaction product 10, each foot 134 includes posts or pins 164 extending through or extending laterally outwardly from main foot body 166. Each foot pin 164 is positioned within a corresponding cylindrical void 162 to couple each foot 134 to front lower leg member 152. In one example, foot 134 is configured to rotate relative to lower leg segment 132 about foot pin(s) 164 in a direction generally indicated in FIG. 7 by arrow 302.

In one embodiment, cavity 160 is sized and shaped, such that when transaction product 10 is in a compact position, each foot 134 can be rotated for placement fully within cavity 160. When transaction product 10 is converted into the expanded form, each foot 134 rotates to extend outwardly, and in one embodiment, substantially perpendicularly away from lower leg segment 132. In one embodiment, feet 134 are configured to contact a support surface (not shown) such as a table, desk, or floor in such a manner that transaction product 10 in an expanded form is sufficient balanced to stand on the support surface.

In one embodiment, after upper leg segment 130 is coupled with torso 12, then bottom portion 142 of rear upper leg member 134 is placed within chamber 154 and coupled to lower leg segment 132 by virtue of being interposed between rear lower leg member 150 and front lower leg member 152. In one embodiment, lower leg segment 132 is slidable relative to upper leg in a direction generally indicated by arrow 306 in FIG. 7. In one example, tabs 146 of upper leg segment 130 interact with lip 158 of lower leg segment 132 to generally prevent or at least decrease the likelihood that lower leg segment 132 will be slid out of chamber 154. In view of the above, upper leg segment 130 and lower leg segment 132 provide one example of means for altering a length leg 20 extends from torso 12.

The above-described construction of leg 20 allows leg 20 to be moved from a compact position (FIGS. 1-6) to an expanded position (FIG. 7). More specifically, in one embodiment, when in the compact position, each upper leg segment 130 is fully enclosed within a respective lower leg segment 132 such that upper leg segment 130 is not visible, and each foot 134 is folded and maintained within cavity 160 of lower leg segment 132. Conversely, in the expanded position each lower leg segment 132 is slid away from torso 12 exposing upper leg segments 130 and increasing the overall length of each leg 20. In addition, in one example, each foot 134 is rotated away from cavity 160 of lower leg segment 132. Other suitable assemblies and formations of suitable legs will be apparent to those of skill in the art upon reading the present application.

Figure 10:
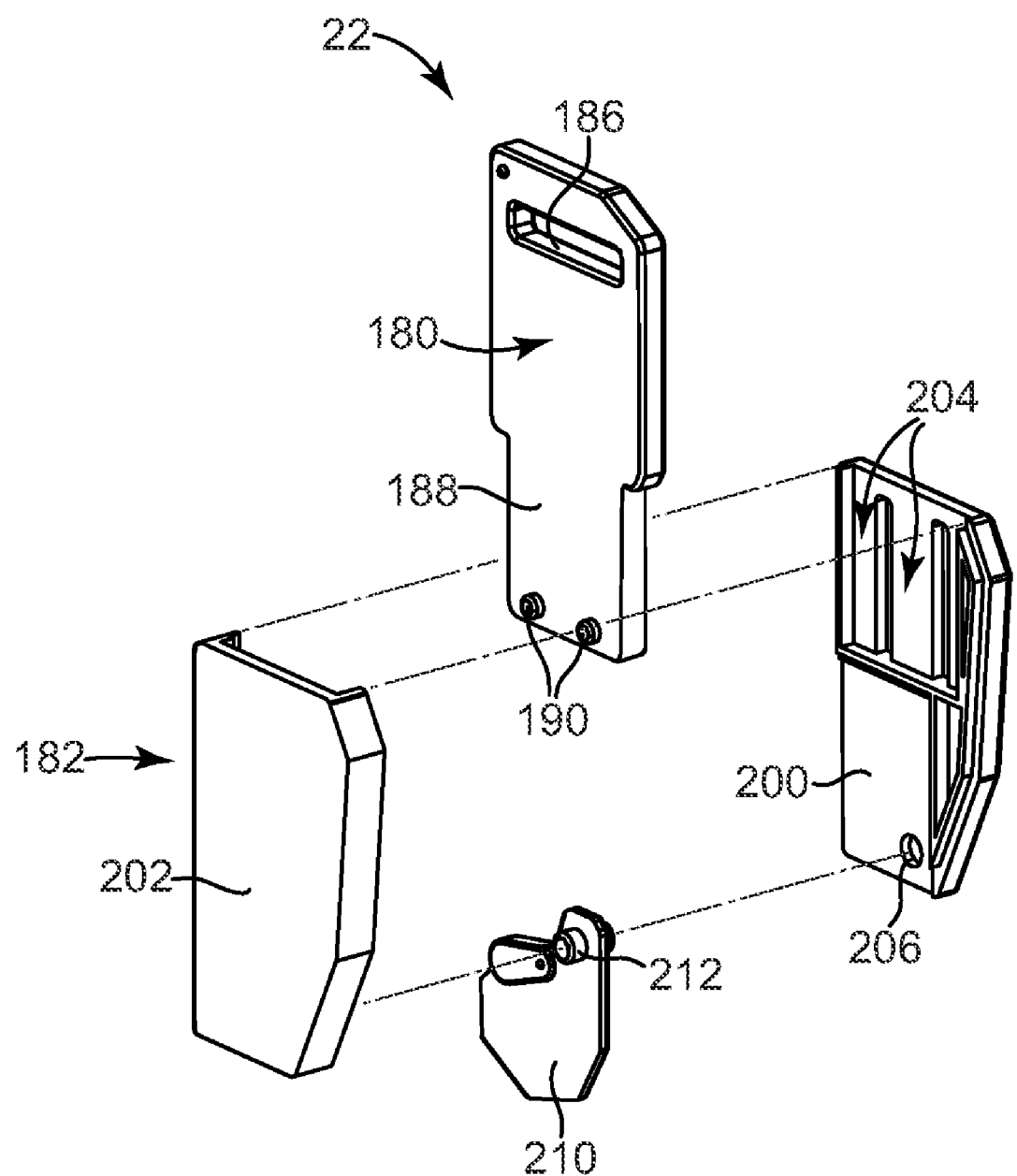
FIG. 10 is an exploded perspective view illustration of an arm of the transaction product of FIG. 8, according to one embodiment of the present invention.

An exploded, perspective view illustration of one embodiment of arm 22 is illustrated in FIG. 10. Arm 22 includes a first or upper arm segment 180 and a second or lower arm segment 182. In one example, upper arm segment 180 is formed of a single piece of material and is substantially rectangular in shape. A slot 186 is laterally defined near a top end thereof. Slot 186 is configured to slidably and rotatably receive a connection pin 60 of torso 12 (FIG. 8) to facilitate coupling of arm 22 with torso 12. As such, upon assembly, upper arm segment 180 is rotatable relative to torso 12 as generally indicated by arrow 308 in FIG. 7. In this manner, slot 186 and pin 60 provide one example of means for rotatably coupling arm 22 to torso 12. In one embodiment, a lower portion 188 of upper arm segment 180 is defined with a slightly smaller width than the remainder of upper arm segment 180 such that lower portion 188 will fit within lower arm segment 182 as will be further described below. Protrusions 190 are extends forwardly and rearwardly (not shown) from lower portion 188 on an opposite end of upper arm segment 180 as compared to slot 186.

In one embodiment, lower arm segment 182 includes a rear lower arm member 200 and a front lower arm member 202. Rear lower arm member 200 and front lower arm member 202 are similarly formed, and each defines cavities 204 downwardly extending from a top edge thereof. In one embodiment, rear lower arm member 200 and front lower arm member 202 each define a cylindrical void 206 near a lower edge thereof.

Prior to assembling rear lower arm member 200 with front lower arm member 202, upper arm segment 180, more specifically, lower portion 188, is positioned between rear lower arm member 200 and front lower arm member 202 such that each protrusion 190 is received by a respective cavity 204. As such, upon coupling of rear lower arm member 200 and front lower arm member 202, upper arm segment 180 is maintained within and slidably coupled with the resulting lower arm segment 182. For example, upper arm segment 180 is slidable relative to torso 12 in the direction generally indicated by arrow 310 in FIG. 7. In one embodiment, one or both of upper arm segment 180 and lower arm segment 182 include a stop or other member (not shown) to limit sliding of upper arm segment 180 relative to lower arm segment 182 to prevent or generally decrease the likelihood that upper arm segment 180 will be inadvertently slid out of lower arm segment 182.

In one embodiment, arm 22 includes a hand 210. Hand 210 may be formed in any suitable manner and, in one example, is a polymeric plate. A peg or pin 212 extends through hand 210 and or extends from each side of hand 210 in a direction substantially perpendicular to the general plane of hand 210. Each pin 212 is sized to be received within a corresponding cylindrical void 206 of lower arm segment 182. As such, where hand 210 is included, hand 210 is positioned to align pins 212 with cylindrical voids 206 prior to coupling rear lower arm member 200 with front lower arm member 202. Once rear lower arm member 200 and front lower arm member 202 are coupled to one another, then hand 210 is interposed therebetween and coupled to lower arm segment 182. In one example, following assembly, hand 210 is rotatable relative to lower arm segment 182 as generally indicated by arrow 312 in FIG. 7.

The above-described construction of arm 22 allows arm 22 to be moved from a compact position (FIGS. 1-6) to an expanded position (FIG. 7). More specifically, in one embodiment, when in the compact position, each lower arm segment 182 is slid toward torso 12 relative to upper arm segment 180, each hand 210 is rotated inwardly and partially into lower arm segment 182, and each arm 22 in its entirety is rotated inward toward torso 12. In one embodiment, a larger portion of arm 22 is substantially enclosed between front torso member 30 and rear torso member 28 when arm 22 is in the compact position as opposed to the expanded position. Conversely, in the expanded position each arm 22 is rotated away from torso 12, lower arm segment 182 is slid relative to upper arm segment 180 away from torso 12, which increases the overall length of each arm 22, and each hand 210 is rotated to extend further out of each corresponding lower arm segment 182. In view of the above, upper arm segment 180 and lower arm segment 182 provide one example of means for altering a length leg 20 extends from torso 12.

Other suitable assemblies and formations of suitable arm will be apparent to those of skill in the art upon reading the present application.

Figure 11:
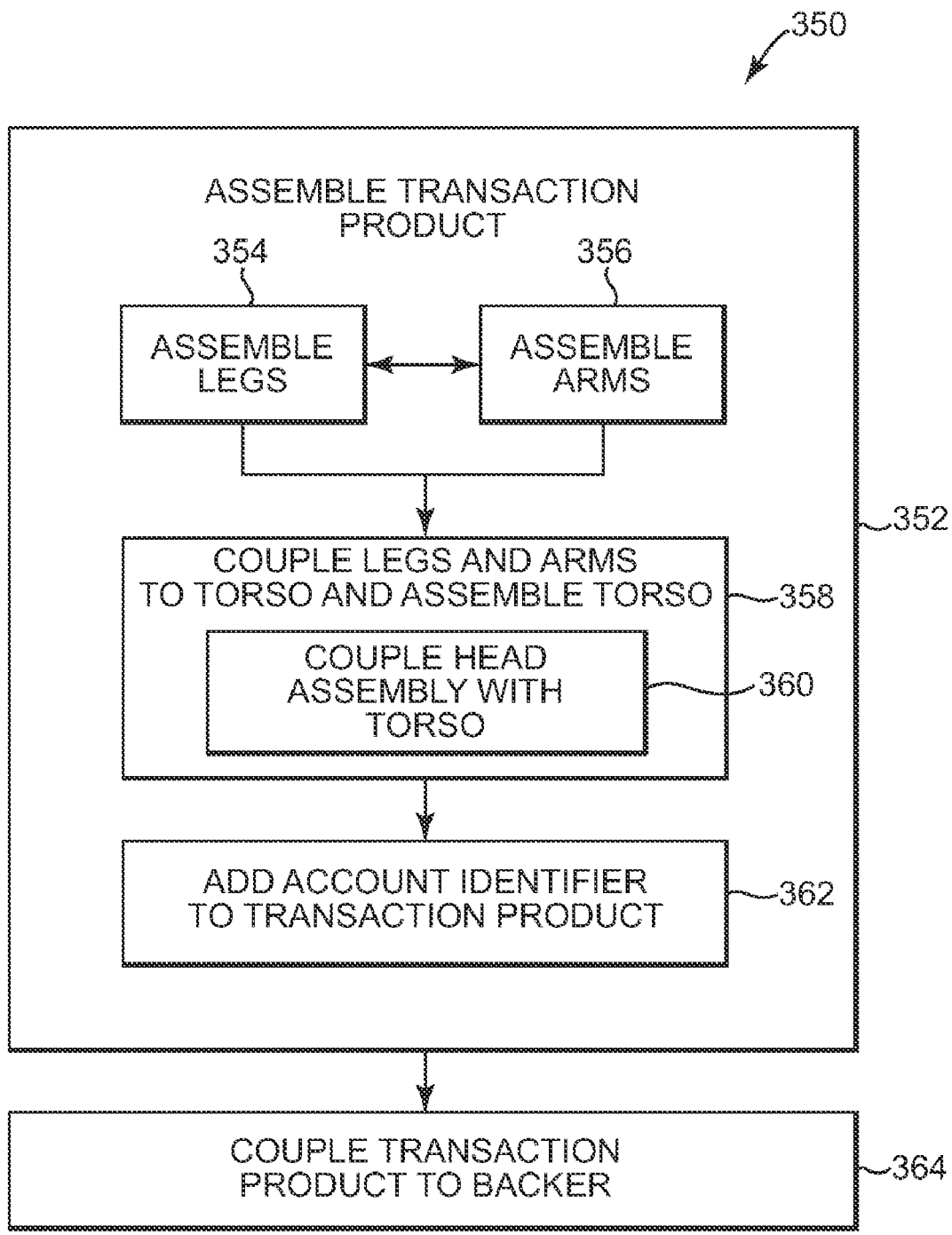
FIG. 11 is a flow chart illustrating a method of assembling the transaction product of FIG. 1, according to one embodiment of the invention.

FIG. 11 illustrates one embodiment of a method of assembling transaction product assembly 404 (FIG. 13) as generally indicated at 350. Method 350 is described below with additional reference to FIGS. 8, 9, and 10. At 352, transaction product 10 is assembled. More specifically, at 354, legs 20 are each assembled, which, in one embodiment, includes assembling each upper leg segment 130 around a respective flange 54 of torso 12 to couple the upper legs 130 thereto. In one embodiment, assembling each leg 20 includes coupling the respective lower legs 132 around bottom portions 142 of each upper leg segment 130 and/or coupling one foot 134 with each lower leg segment 132 as described above.

At 356, arms 22 are assembled. In particular, each arm 22 is assembled by coupling front lower arm member 202 to rear lower arm member 200 such that upper arm segment 180 is received therebetween and protrusions 190 are positioned within the respective cavities 204. In one embodiment, assembling lower arm segment 182 also includes positioning hand 210, more specifically, pin 212 of hand to be received by cylindrical voids 206 of front lower arm member 202 to rear lower arm member 204 prior to coupling front lower arm member 202 with rear lower arm member 204. Once front lower arm member 202 and rear lower arm member 204 are coupled together, upper arm segment 180, lower arm segment 182, and hand 210 are coupled together as described above.

At 358, legs 20 and arms 22 that are not already coupled with torso 12 are coupled to torso 12, and torso 12 is assembled. In particular, if legs 20 have not already been coupled with torso 12 during operation 354, upper leg segment 130 is manipulated to receive pegs 56. Arms 22 are positioned such that slot 186 of each arm 22 is positioned over a respective pin 60. If head assembly 40 is included in transaction product 10, then operation 358 includes positioning head assembly 40 relative to cavity 36 and aperture 74 at 360, as described above with respect to FIG. 8. Once arms 22 and/or head assembly 40 are in position, rear torso member 28 and front torso member 30 are coupled to one another in any suitable manner. Once rear torso member 28 and front torso member 30 are coupled, arms 22 and head assembly 40 are interposed between and thereby coupled to torso 30.

At 362, account identifier 16 is added to transaction product 10 by printing, adhesive, or any other suitable manner. In one embodiment, such as where account identifier 16 is an RFID device, account identifier 16 may be positioned within torso 12 or other portion of transaction product 10. As such, although shown as occurring after operation 358, operation 362 may be completed prior to or during any of operations 354, 356, and 358.

Figure 12:
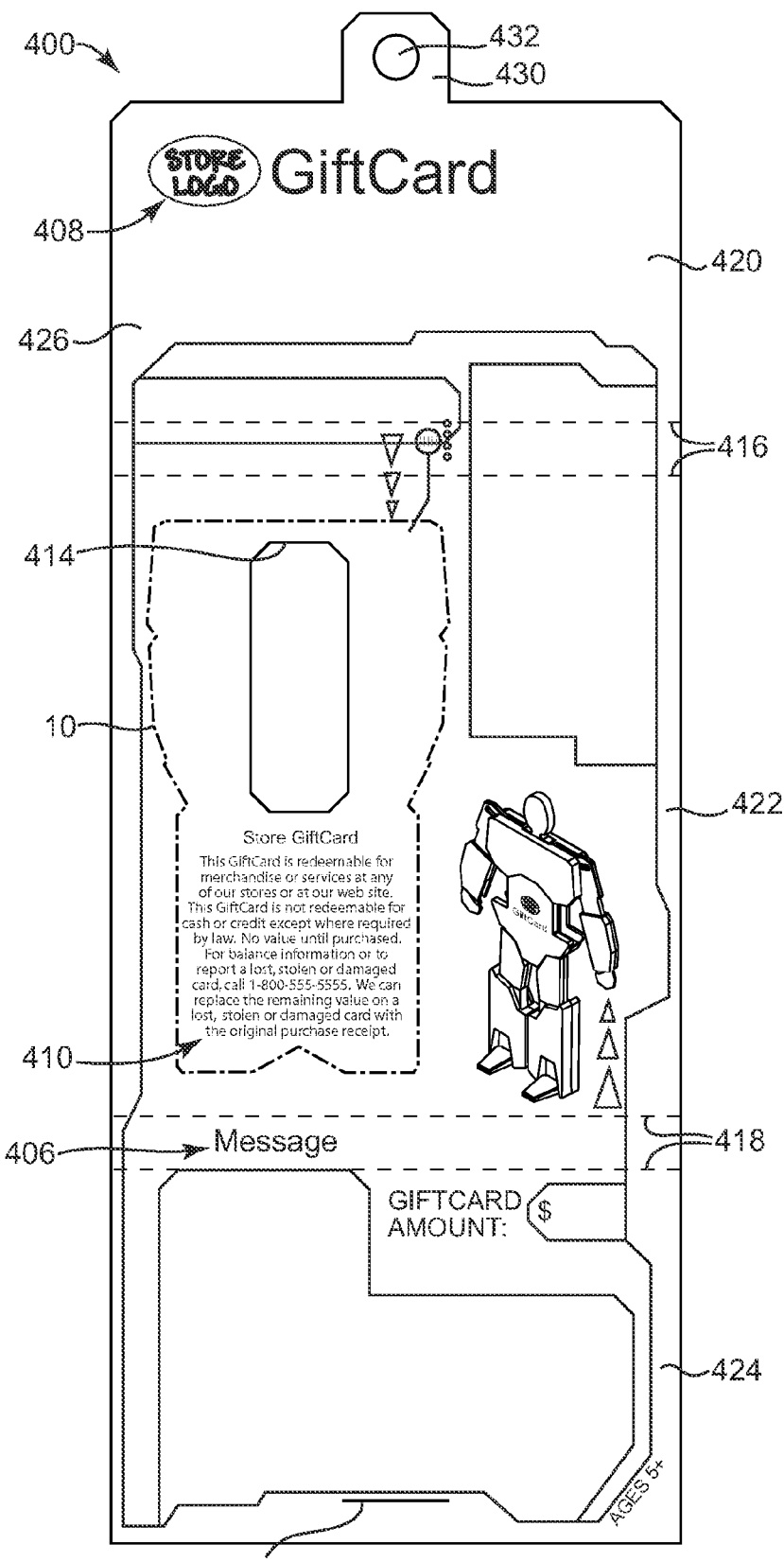
FIG. 12 is a front view illustration of a backer, according to one embodiment of the present invention.
Figure 13:
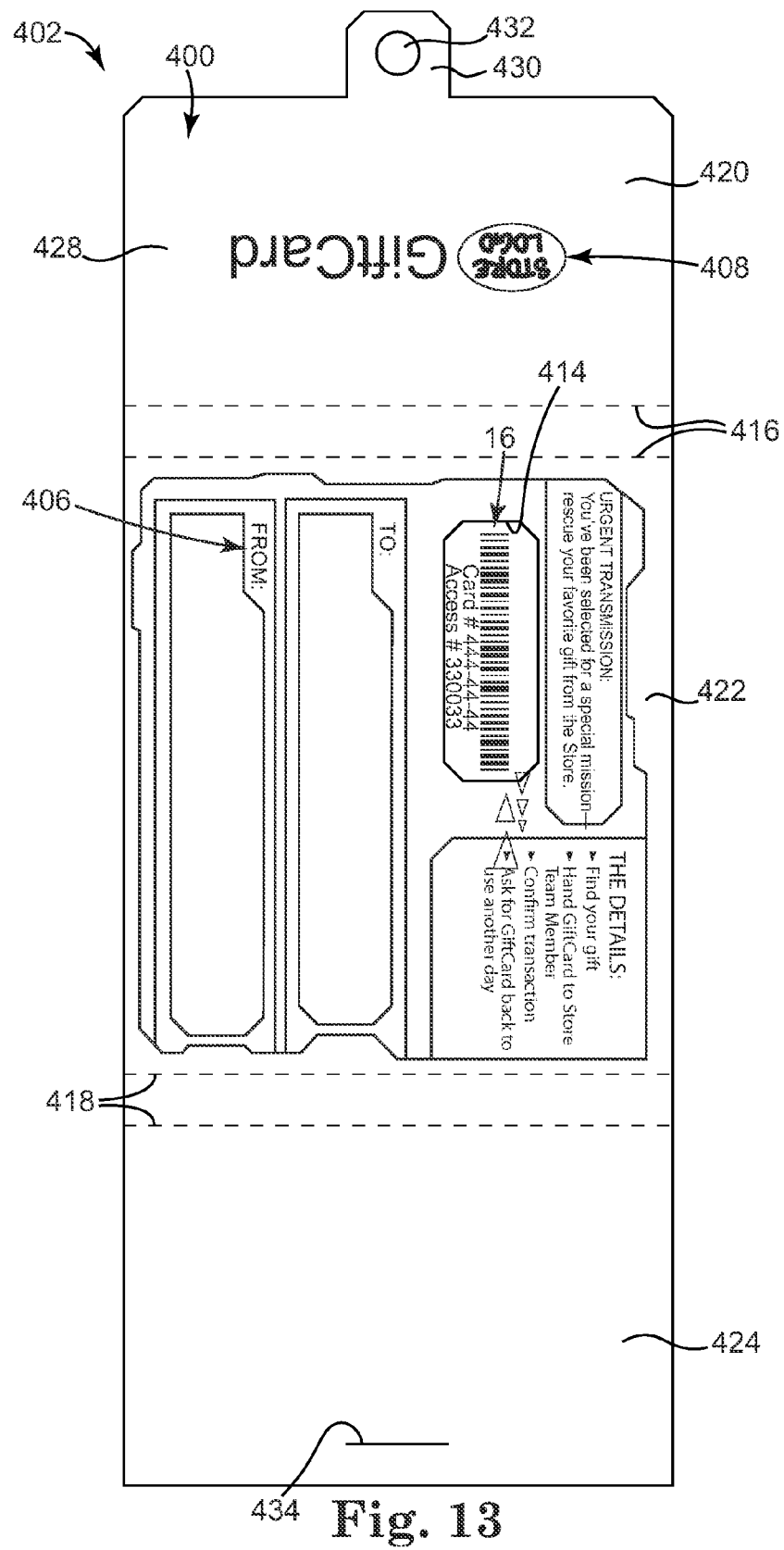
FIG. 13 is a rear view illustration of a transaction product assembly including the backer of FIG. 12 and the transaction product of FIG. 1, according to one embodiment of the present invention.

In one embodiment, once transaction product 10 is assembled, then at 364, transaction product 10 is coupled with a backer or carrier configured to support transaction product 10 during display, transport, and/or presentation to a recipient. FIGS. 12 and 13 illustrate one embodiment of a carrier or backer 400 configured to be selectively coupled with and to support transaction product 10 (FIG. 13). Transaction product 10, which is represented in phantom lines in FIG. 12 for illustrative purposes so as to not obstruct backer 400, is readily releasably attached to backer 400, for example by a removable adhesive, an overlying skinning material, or the like. Backer 400 and transaction product 10 collectively define a transaction product assembly 402 (FIG. 13). Backer 400 comprises a single layer or multiple layers of paper or plastic material, for example, generally in the form of a relatively stiff but bendable/flexible card. Use of other materials is also contemplated. Backer 400 displays indicia, graphics or text information including store logo(s), store name(s), slogans, advertising, instructions, directions, brand indicia, promotional information, holiday indicia, seasonal indicia, media format identifiers, characters, and/or other information.

For example, indicia 406 include to, from, amount, and message fields. The fields of indicia 406 provide areas of backer 400 configured to be written upon by a consumer to personalize backer 400 for presentation as a gift to a particular recipient, for a particular purpose, and/or to indicate a value of transaction product 10. In one embodiment, transaction product 10 includes brand indicia 408, which identifies a store, brand, department, etc. and/or services associated with transaction product 10.

Referring to FIG. 12, in one embodiment, backer 400 includes indicia 410 indicating that transaction product 10 is redeemable for the purchase of goods and/or services and that upon use, a value of the purchased goods and/or services will be deducted from the financial account or record linked to transaction product 10. In one embodiment, indicia 410 include phrases such as "<NAME OF STORE>GiftCard" and "This GiftCard is redeemable for merchandise or services at any of our stores or at our web site," and/or provides help or phone line information in case of a lost, stolen, or damaged transaction product 10, etc. In one embodiment, any of indicia 406, 408, 410, or other indicia optionally may appear anywhere on backer 400 or transaction product 10. Additional information besides that specifically described and illustrated herein may also be included and/or one or more of indicia 406, 408, and 410 may be eliminated.

In one embodiment, backer 400 includes a window or opening 414 for displaying account identifier 16 of transaction product 10 therethrough as illustrated in FIG. 13. As previously described, account identifier 16 is adapted for accessing an account or a record associated with transaction product 10 for activating, loading value to, or debiting value from the account or record. Accordingly, opening 414 allows viewing or other access to account identifier 16 to activate and/or load transaction product 10 without removing transaction product 10 from backer 400. In one embodiment, a portion of backer 400 alternatively is configured to be folded away from the remainder of backer 400 to access account identifier 16 without removing transaction product 10 from backer 400.

In one embodiment, backer 400 is a multiple fold substrate defining a first fold lines 416 and a second fold lines 418, about which backer 400 is foldable. In FIGS. 12 and 13, backer 400 is unfolded, i.e. is in an open configuration. As such, fold lines 416 and 418 divide backer 400 into first, second, and third panels 420, 422, and 424. Fold lines 416 and 418 facilitate folding backer 400 to wrap transaction product 10 or to otherwise ready transaction product 10 for display or presentation. In one embodiment, transaction product 10 is secured to second panel 422, which is positioned between fold lines 416 and 418, and therefore, between first and second panels 420 and 424.

In one example, backer 400 is foldable about fold lines 416 and 418 such that inside surfaces 426 (FIG. 12) of backer 400 are folded toward each other and transaction product 10 is enclosed or wrapped in a compact package formed by foldable backer 400. In this manner, outside surfaces 428 (FIG. 13) of backer 400 are disposed toward the outside of the folded, compact package, according to embodiments of the invention. In one embodiment, folded backer 400 effectively wraps transaction product 10 for presentation from a consumer to a recipient. Folding backer 400 in the other directions about fold lines 416 and 418 for display on a rack in a retail setting, or about other fold lines of backer 400 is also contemplated.

In one example, backer 400 additionally includes a tab 430 with an aperture 432 defined through a center thereof. Aperture 432 is sized to receive a support arm or other fixture (not shown) in a retail setting such that transaction product assembly 402 can be hung from the support arm for display to potential consumers. In one embodiment, tab 430 extends from first panel 420, and third panel 424 defines a cut 434 laterally positioned on third panel 424 to align with and receive tab 430 when backer 400 is folded about fold lines 416 and 418. More specifically, upon folding backer 400 about fold lines 416 and 418 to close backer 400 around transaction product 10, tab 430 is slid through cut 434 to maintain backer 400 in a folded or wrapped position around transaction product 10. In view of the above, backer 400 is one example of means for supporting transaction product 10 for display in a retail setting. Other backers similar to backer 400 can be used having various sizes and shapes for supporting transaction product 10.

Figure 14:
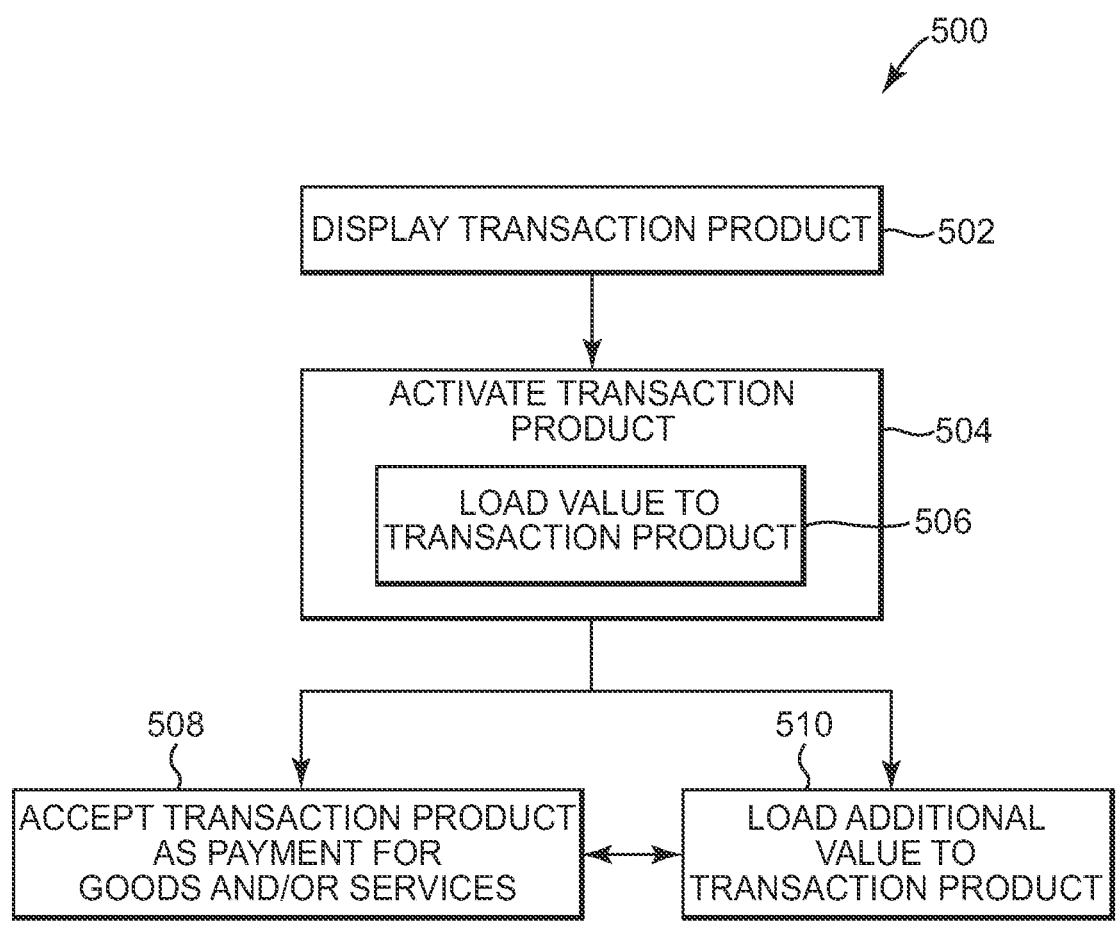
FIG. 14 is a flow chart illustrating a method of encouraging purchase and facilitating use of a transaction product, according to one embodiment the present invention.

FIG. 14 is a flow chart illustrating one embodiment of a method 500 of encouraging purchase and facilitating use of transaction product 10 by consumers and/or recipients. At 502, transaction product 10 is placed on or hung from a rack, shelf, or other similar device to display transaction product 10 for sale to potential consumers. For example, additionally referring to FIGS. 12 and 13, backer 400 may be hung from a display rack using aperture 432 such that transaction product 10 is readily visible to potential consumers. In one embodiment, a depiction of transaction product 10 is placed on a web site for viewing and purchase by potential consumers.

At 504, a consumer who has decided to purchase transaction product 10 presents transaction product 10 on backer 400 to a retail store employee, retail store kiosk, remote terminal, or other person or device to scan account identifier 16 to access an account or record linked to account identifier 16. In particular, account identifier 16 is scanned or otherwise accessed, for example through opening 414 of backer 400 to activate transaction product 10. Upon accessing the account or record, then, at 506, value is added to the account or record in the form of monetary value, points, minutes, etc. Thus, transaction product 10 is activated and loaded.

Once transaction product 10 is activated and loaded, transaction product 10 can be used by the consumer or any other bearer of transaction product 10 to purchase goods and/or services at the affiliated retail setting (e.g., a retail store or web site) or can be used in exchange for calling minutes, etc. In one embodiment, where transaction product 10 is displayed on a web site at 502, then, at 504, transaction product 10 may be activated in any suitable method and may not require the physical scanning of account identifier 16 to be activated or to otherwise access the associated account or record such as at 506.

In one example, at 508, the retail store or other affiliated retail setting or web site accepts transaction product 10 as payment towards the purchase of goods and/or services made by the current bearer of transaction product 10. In particular, the value currently loaded on transaction product 10 (i.e., stored or recorded in the account or record linked to account identifier 16) is applied toward the purchase of goods and/or services. At 510, additional value is optionally loaded on transaction product 10 at a point-of-sale terminal, kiosk, or other area of the retail store or related setting. Upon accepting transaction product 10 as payment at 508, the retail store or related setting can subsequently perform either operation 508 or operation 510 as requested by a current bearer of transaction product 10. Similarly, upon loading additional value on transaction product 10 at 510, the retail store or related setting can subsequently perform either operation 510 again or operation 508. In one example, the ability to accept transaction product 10 as payments for goods and/or services is limited by whether the account or record associated with transaction product 10 has any value stored or recorded therein at the time of attempted redemption.

Figure 15:
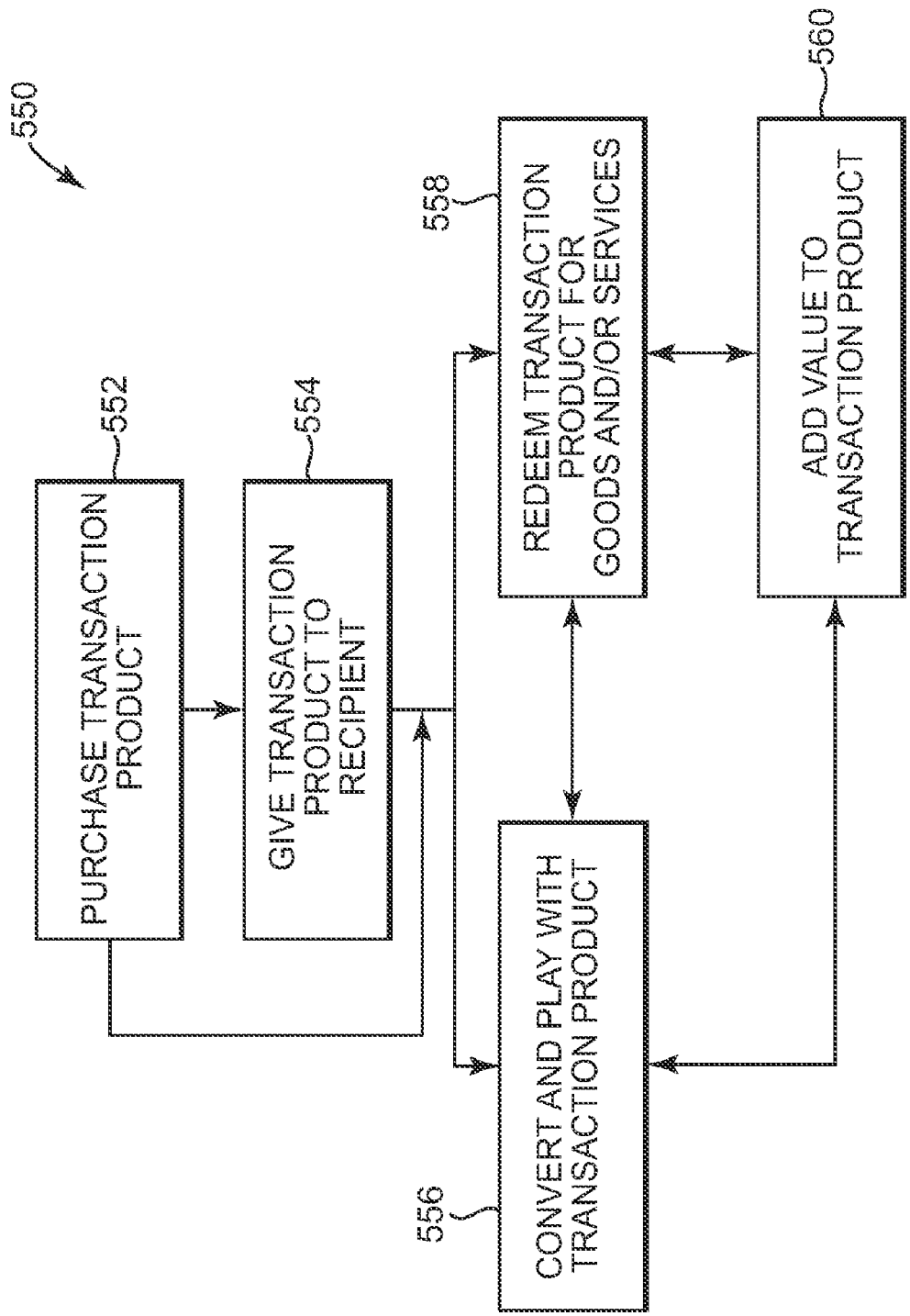
FIG. 15 is a flow chart illustrating a method of using a transaction product, according to one embodiment of the present invention.

FIG. 15 is a flow chart illustrating one embodiment of a method 550 of using transaction product 10 (e.g., FIGS. 1-8). At 552, a potential consumer of transaction product 10, which is displayed in a retail store or viewed on a web site, decides to and does purchase transaction product 10 from the retail store or web site. It should be understood that transaction product 10 can be displayed and purchased alone or as part of transaction product assembly 402 (FIG. 13) along with backer 400. Upon purchasing transaction product 10, a retail store employee, a retail store kiosk, or other person or device scans account identifier 16 (FIGS. 3 and 13) through opening 414 of backer 400 or otherwise reads or accesses account identifier 16. Upon accessing account identifier 16, the account or record linked to account identifier 16 is accessed and activated to load value onto transaction product 10 (i.e., load value to the account or record associated with transaction product 10). In one embodiment, such as where transaction product 10 is purchased at 552 via a web site, actual scanning or other mechanical detection of account identifier 16 may be eliminated and/or manual input of access code 18 may be added.

At 554, the consumer optionally gives transaction product 10 to a recipient, such as a graduate, relative, friend, expectant parents, one having a recent or impending birthday, a couple having a recent or impending anniversary, etc. In one embodiment, a plurality of transaction products 10 are purchased and given to party goers, such as at a birthday party, etc. as party favors or gifts. As an alternative, the consumer can keep transaction product 10 for his or her own use thereby eliminating operation 554.

At 556, the consumer, recipient, or other current bearer of transaction product 10 plays with transaction product 10. In one embodiment, playing with transaction product 10 at 556 includes converting transaction product 10 from its storage or compact form (FIGS. 1-7) to its expanded form (FIG. 8). In one example, as described above, converting transaction product 10 to the expanded form includes one or more of rotating leg 20 and/or arm 22 relative to torso 12, sliding lower leg segment 132 and/or lower arm segment 182 relative to the corresponding upper leg segment 130 and/or upper arm segment 180, and rotating foot 134 and/or hand 210 relative to the corresponding lower leg segment 132 and/or lower arm segment 182. In one example, to complete conversion of transaction product 10 into the expanded form, button 84 is pushed, to release head member 80 to extend out of torso 12. In view of the above, in one embodiment, when all of the plurality of auxiliary components 14 and head member 80 are in their respective expanded positions, transaction product 10 as a whole is in expanded form. Once in the expanded form, transaction product 10 may be used as an action figure, doll, or other toy to amuse the bearer and/or any other observers of transaction product 10.

Playing with transaction product 10 can also include converting transaction product 10 from the expanded form back to the compact form by moving or rotating all of the plurality of auxiliary components 14 and the head member 80 back to their compact positions. In one embodiment, when in transaction product 10 is the compact form, lower leg segment 132 and lower arm segment 182 are from a front or rear of transaction product 10 while upper leg segment 130 and upper arm segment 180 are generally hidden from view. In one example, converting transaction product 10 between the compact form and the expanded form itself serves to amuse the bearer and/or any other observers of transaction product 10.

At 558, the consumer or recipient redeems transaction product 10 for goods and/or services from the retail store or web site. At 560, the consumer or recipient of transaction product 10 optionally adds value to transaction product 10, more particularly, to the account or record associated with account identifier 16 included therewith, at the retail store or over the Internet (i.e., via the web site). Upon playing with transaction product 10 at 556, redeeming transaction product 10 at 558, or adding value to transaction product 10 at 560, the consumer or recipient of transaction product 10 subsequently can perform either of operations 556, 558, or 560 as desired. In one embodiment, the ability of the consumer or recipient to repeat redeeming transaction product 10 at 558 is limited by whether the account or record linked with transaction product 10 has any remaining value stored or recorded therein at the time of attempted redemption.

Although described above as occurring at a single retail store or web site, in one embodiment, purchasing transaction product 10 at 552, redeeming transaction product 10 at 558, and adding value to transaction product 10 at 560, can each be performed at any one of a number of stores adapted to accept transaction product 10 or over the Internet. In one example, a number of stores are each part of a chain or are similarly branded stores. In one example, a number of stores include at least one web site and/or at least one conventional brick and mortar store.

Figure 17:
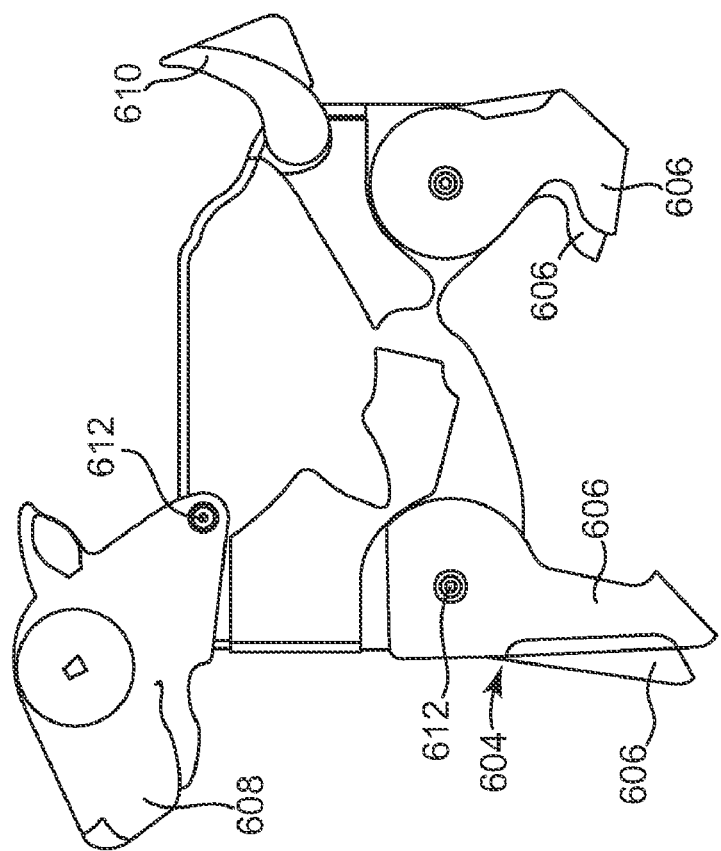
FIG. 17 is a front view illustration of the transaction product of FIG. 16 in an expanded form, according to one embodiment of the present invention.
Figure 16:
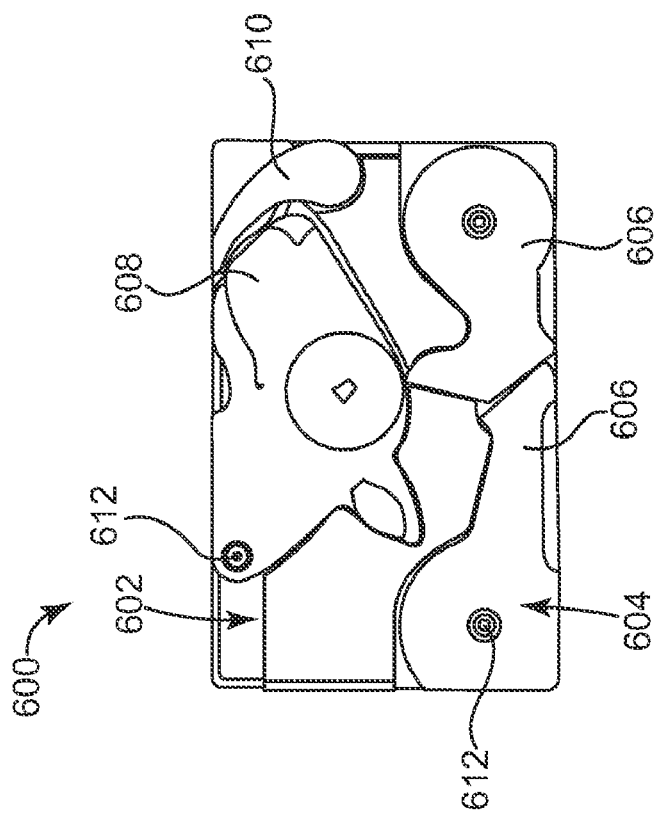
FIG. 16 is a front view illustration of a transaction product in a compact form, according to one embodiment of the present invention.

FIGS. 16 and 17 illustrate one embodiment of a transaction product 600 configured to form a dog or other four legged animal when in an expanded form (FIG. 17). Transaction product 600 is configured for use toward the purchase of goods and/or services and includes an account identifier 16 (not shown in FIGS. 16 and 17) similar to that described above with respect to transaction product 10. Transaction product 600 includes a primary component or torso 602 and a plurality of appendages or auxiliary components 604. In one embodiment, the plurality of auxiliary components 604 includes legs 606, a head 608, and a tail 610.

Each of legs 606, head 608, and tail 610 are rotatably coupled with torso 602 in any suitable manner (e.g., with rivets or other suitable connectors). Each of the plurality of auxiliary components 604 and rotate between a compact position (FIG. 16) and an expanded position (FIG. 17). When the plurality of auxiliary components 604 are all in their respective compact positions, transaction product 10 is in a compact form and, in one example, has a generally rectangular shape and a length and width similar to that of a conventional financial transaction product such that, transaction product 600 may readily be placed and stored in a wallet of the bearer of the transaction product 600. When the plurality of auxiliary components 604 are all in their respective expanded positions, transaction product 10 is in the expanded form and appears similar to a dog or other four legged animal. Other modifications and transaction products according to the present invention will be apparent to those of skill in the art upon reading this application.

Transaction products come in many forms, according to embodiments of the invention. The gift card, like other transaction products, can be "re-charged" or "re-loaded" at the direction of the original consumer, the gift recipient, or a third party. The term "loading on" or "loaded on" herein should be interpreted to include adding to the balance of an account or record associated with a transaction product. The balance associated with the transaction product declines as the card is used, encouraging repeat visits or use. The card remains in the user's purse or wallet, serving as an advertisement or a reminder to revisit the associated merchant. Gift cards according to embodiments of the invention provide a number of advantages to both the consumer and the merchant. Other gift cards and transaction products according to embodiments of the invention include loyalty cards, merchandise return cards, electronic gift certificates, calling cards, employee cards, frequency cards, prepaid cards, and other types of cards associated with or representing purchasing power, monetary value, etc.

Although the invention has been described with respect to particular embodiments, such embodiments are meant for illustrative purposes only and should not be considered to limit the invention. Various alternatives and changes will be apparent to those of ordinary skill in the art. Other modifications within the scope of the invention and its various embodiments will be apparent to those of ordinary skill.

What is claimed is:

1. A mechanically convertible transaction product comprising:
    a body,
    two or more appendages each rotatably coupled with the body and configured to selectively rotate relative to the body between a compact position and an expanded position, wherein each of the two or more appendages extends further away from the body when in the expanded position such that an overall form of the mechanically convertible transaction product is altered when any of the two or more appendages are in the expanded position as compared to when all of the two or more appendages are in the compact position;
    an account identifier linking the transaction product to an account or record; and
    an additional appendage separate from the two or more appendages, the additional appendage being movably coupled to the body such that the additional appendage is movable between a first position and a second position, and wherein the additional appendage is at least partially enclosed within the body when the additional appendage is in the first position, and the additional appendage is biased toward the second position;
    wherein the additional appendage includes a head member configured to slide between the first position where the head member is substantially enclosed within the body and the second position where the head member at least partially extends from the body.

2. The mechanically convertible transaction product of claim 1, wherein the account identifier is a bar code.

3. The mechanically convertible transaction product of claim 1, wherein the account identifier is machine readable by a point-of-sale terminal and includes at least one of a bar code, a magnetic strip, a smart chip, and a radio frequency identification (RFID) device.

4. The mechanically convertible transaction product of claim 1, wherein the body is a torso and the two or more appendages include one or more of an arm, a leg, a head, and a tail.

5. The mechanically convertible transaction product of claim 1, wherein the two or more appendages are arms, and the transaction product further comprises two legs coupled with the body.

6. The mechanically convertible transaction product of claim 5, wherein each of the two legs is rotatably coupled with the body.

7. The mechanically convertible transaction product of claim 1, in combination with a backer selectively coupled with and configured to support the mechanically convertible transaction product, wherein the backer is substantially planar and configured to selectively wrap around the mechanically convertible transaction product.

8. The mechanically convertible transaction product of claim 1, wherein when the two or more appendages are each in the compact position, the mechanically convertible transaction product has a substantially rectangular overall shape.

9. The mechanically convertible transaction product of claim 1, wherein at least one of the body and the two or more appendages includes a front member and a rear member coupled to the front member.

10. The mechanically convertible transaction product of claim 1, wherein:
the additional appendage is slidably coupled to the body in a manner allowing the additional appendage to linearly slide between the first position and the second position while the additional appendage is coupled to the body,
the additional appendage extends further away from the body when in the second position than when in the first position,
the mechanically convertible transaction product includes a biasing member imparting a force to the additional appendage to bias the additional appendage toward the second position, and
the force continuously acts on the additional appendage while the additional appendage is in the first position and in the second position.

11. The mechanically convertible transaction product of claim 1, wherein:
the body defines a cavity having an opening on a first side of the cavity,
the additional appendage is formed separately from the body and defines a first end and a second end opposite the first end,
in the first position, the additional appendage is entirely maintained within the cavity and is only visible via the opening on the first side of the cavity, and
in the second position, the first end of the additional appendage extends outside of the cavity and beyond an outer edge of the body.

12. The mechanically convertible transaction product of claim 11, wherein:
a spring is included in the cavity and interacts with the second end of the additional appendage,
the mechanically convertible transaction product includes a button formed separately from and extending through the body and directly interacting with the additional appendage in a manner initially maintaining the spring in a compressed position and the additional appendage in the first position,
upon user interaction with a portion of the button extending outside the body, the button is configured to release the additional appendage allowing the spring to extend to cause linear movement of the additional appendage from the first position to the second position, and
the button is configured to selectively and repeatedly interact with the additional appendage to hold the additional appendage in the first position and to release the additional appendage allowing the additional appendage to move to the second position due to force from the spring.

13. The mechanically convertible transaction product of claim 1, further comprising a biasing member enclosed within the body and imparting a force to the additional appendage to bias the additional appendage toward the second position, wherein the force continuously acts on the additional appendage while the additional appendage is in the first position, in the second position, and in any position between the first position and the second position.

14. The mechanically convertible transaction product of claim 1, wherein the head member is substantially enclosed within the body when at least all but at least one edge of the head member is positioned within the body and hidden from view of a bearer of the mechanically convertible transaction product by the body.

15. The mechanically convertible transaction product of claim 1, further comprising:
an actuation member extending through the additional appendage, wherein user interaction with the actuation member removes an impediment to the force allowing the additional appendage to move from the first position to the second position.

16. A stored-value card comprising:
a primary component defining a cavity with an opening to the cavity;
means for selectively maintaining a member within the cavity;
means for actuating at least partial release of the member from within the cavity, wherein the member extends out of the primary component when the member is at least partially released from within the cavity;
means for biasing the member to extend out of the primary component; and
means for linking the means for selectively maintaining with an account or record such that, via the means for linking, the stored-value card is configured for use toward a purchase of one or more of goods and services;
wherein:
the means for biasing is a coil spring maintained within the cavity opposite the opening relative to the member, and
the means for actuating is an actuating element extending from outside the primary component into the cavity and through a slot in the member, wherein the actuating element is biased to a first actuating element position, in which the actuating element interacts with the member to prevent movement of the member, and when a user interacts with the actuating element, the actuating element moves from the first actuating element position to a second actuating element position, in which the actuating element allows the member to be at least partially released from the cavity and to extend out of the primary component due to force from the coil spring on the member.

17. The stored-value card of claim 16, wherein the actuating element includes a push button.

18. The stored-value card of claim 16, wherein the primary component includes a body of a character, and the member includes a head of the character.

19. The stored-value card of claim 16, further comprising means for rotatably coupling an auxiliary component to the primary component.

20. The stored-value card of claim 19, wherein the means for rotatably coupling the auxiliary component to the primary component allows the auxiliary component to be rotated between a first position and a second position, and wherein the auxiliary component extends further away from the primary component when the auxiliary component is in the second position as compared to the first position.

21. A transaction product comprising:
a body defining a cavity with an opening to the cavity,
two or more appendages each rotatably coupled with the body and configured to selectively rotate relative to the body between a compact position and an expanded position, wherein each of the two or more appendages is moved further away from the body when in the expanded position such that an overall form of the transaction product is altered when either of the two or more appendages is in the expanded position as compared to when all of the two appendages are in the compact position;
means for selectively maintaining a member within the cavity, wherein the member defines an aperture;
means for actuating at least partial release of the member from within the cavity, wherein the member extends out of the body when the member is at least partially released from within the cavity, and the means for actuating extends through the aperture of the member;
means for biasing the member to extend out of the body; and
an account identifier linking the transaction product to an account or record.

22. The transaction product of claim 21, wherein the member is slidably coupled with the body.

23. A method of encouraging purchase and facilitating use of a stored-value product, the method comprising:
displaying the stored-value product including a primary component, a plurality of auxiliary components movably coupled with the primary component, and an activation area, wherein:
each of the plurality of auxiliary components is configured to one of slide and rotate relative to the primary component between a corresponding first position and a corresponding second position,
the stored-value product has a substantially rectangular shape when each of the plurality of auxiliary components is in the corresponding first position,
the stored-value product has a substantially non-rectangular shape when each of the plurality of auxiliary components is in the corresponding second position,
the activation area links the stored-value product to an account or record, and
the stored-value product includes:
a biasing member continuously providing a biasing force on one of the plurality of auxiliary components pushing the one of the plurality of auxiliary components toward the corresponding second position, and
a button directly interacting with the one of the plurality of auxiliary components to provide a counter force of sufficient strength to overcome the biasing force and hold the at least one of the plurality of auxiliary components in the corresponding first position until a bearer of the stored-value product moves the button to release the counter force; and
activating the stored-value product to permit deductions from the account or record using the activation area.

24. The method of claim 23, wherein each of the plurality of auxiliary components extends further away from the primary component when in the corresponding second position than when in the corresponding first position.

25. The method of claim 23, wherein the primary component, the activation area, and each of the plurality of auxiliary components are separately formed of injection molded plastic.

26. The method of claim 23, wherein the substantially non-rectangular shape is substantially a shape of at least one of an action figure, a person, and an animal.

27. The method of claim 23, wherein:
the one of the plurality of auxiliary components is slidable between the corresponding first position and the corresponding second position, and the one of the plurality of auxiliary components is entirely enclosed within the primary component in the corresponding first position and at least partially extends out of the primary component in the corresponding second position,
the button is configured to selectively and repeatedly move between a first button position and a second button position, the button being biased toward the first button position,
while in the first button position, the button provides the counter force, and
when a user interacts with the button, the button moves to the second button position, which removes the counter force allowing and actuating movement of the one of the plurality of auxiliary components to the second position.

* * * * *